United States Patent
Liu

(10) Patent No.: US 7,526,210 B2
(45) Date of Patent: Apr. 28, 2009

(54) OPTICAL DEMODULATING APPARATUS AND METHOD

(75) Inventor: Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 451 days.

(21) Appl. No.: 11/163,190

(22) Filed: Oct. 8, 2005

(65) Prior Publication Data

US 2007/0081826 A1    Apr. 12, 2007

(51) Int. Cl.
*H04B 10/04* (2006.01)
*H04B 10/12* (2006.01)

(52) U.S. Cl. .................. 398/188; 398/183; 398/201; 359/279; 359/325

(58) Field of Classification Search .......... 398/182, 398/183, 188, 202, 185, 200, 201; 375/235, 375/261, 298; 370/206; 359/247, 261, 263, 359/325, 279, 238, 251, 267
See application file for complete search history.

(56) References Cited

U.S. PATENT DOCUMENTS

| | | | | |
|---|---|---|---|---|
| 4,773,732 A * | 9/1988 | Schafer | ...................... | 359/578 |
| 6,426,816 B1 * | 7/2002 | Wu et al. | ...................... | 398/65 |
| 7,259,901 B2 * | 8/2007 | Parsons et al. | .............. | 359/237 |
| 2003/0072051 A1 * | 4/2003 | Myers et al. | ................ | 359/115 |
| 2004/0081469 A1 * | 4/2004 | Conway et al. | ............. | 398/188 |
| 2004/0081470 A1 * | 4/2004 | Griffin | ........................ | 398/188 |
| 2005/0220459 A1 * | 10/2005 | Schrodinger | ................ | 398/202 |
| 2006/0171718 A1 * | 8/2006 | Hoshida | ..................... | 398/152 |

* cited by examiner

*Primary Examiner*—M. R. Sedighian

(57) ABSTRACT

An optical demodulator and accompanying method(s) that demodulates a DQPSK signal employing a single optical delay interferometer comprising a free-space Michelson interferometer having two optical paths, connected to a 1×2 coupler. Positioned within an arm of the Michelson interferometer is a phase shifter that produces a phase difference of π/2 between the two paths. The resulting demodulator is compact, reliable, and may be constructed to be substantially immune from undesirable thermal sensitivities.

15 Claims, 3 Drawing Sheets

PRIOR ART  FIG. 1

OPTICAL DEMODULATING APPARATUS AND METHOD

FIELD OF THE INVENTION

The present invention relates generally to the field of optical communications and in particular to methods and apparatus for demodulating and receiving optical signals having Differential-Quadrature-Phase-Shift-Keying (DQPSK) format(s).

BACKGROUND OF THE INVENTION

Optical DQPSK is a promising modulation format that is attracting considerable commercial attention as a result of its high receiver sensitivity, high spectral efficiency (SE), high filtering and dispersion tolerance(s). Of particular interest, DQPSK may be used in combination with amplitude modulation to achieve even higher spectral efficiencies.

In optical DQPSK transmission, data is conveyed by an optical phase difference between adjacent bits. In order to detect the data contained within a DQPSK transmission, an optical demodulator is used to convert the phase-coded signal into intensity-coded signals. Typically, such optical demodulators are constructed from a pair of optical delay interferometers (ODIs).

Unfortunately, contemporary optical demodulators so constructed are quite complex, requiring precise control of the absolute phase difference between the two arms of each of the two ODIs, and precise length matching among the multiple optical paths prior to any data recovery circuits. In addition, conventional ODIs are fiber-based or planar-waveguide-based, which are temperature sensitive and therefore require precise temperature control and stabilization, particularly when employed in high performance optical transmission systems.

SUMMARY OF THE INVENTION

I have developed an optical demodulator that, together with accompanying method(s), demodulates a DQPSK signal without exhibiting the infirmities that plague the prior art. More particularly, this inventive optical demodulator and method employs a single optical delay interferometer comprising a free-space Michelson interferometer having two optical paths, connected to a 1×2 coupler. Positioned within an arm of the Michelson interferometer is a phase shifter that produces a phase difference of $\pi/2$ between the two paths.

This innovative demodulator construction—from a single free-space Michelson interferometer—results in a demodulator that is compact, reliable, and may be constructed to be substantially immune from undesirable thermal sensitivities.

BRIEF DESCRIPTION OF THE DRAWING

A more complete understanding of the present invention may be realized by reference to the accompanying drawing in which.

DETAILED DESCRIPTION

Figure 1:
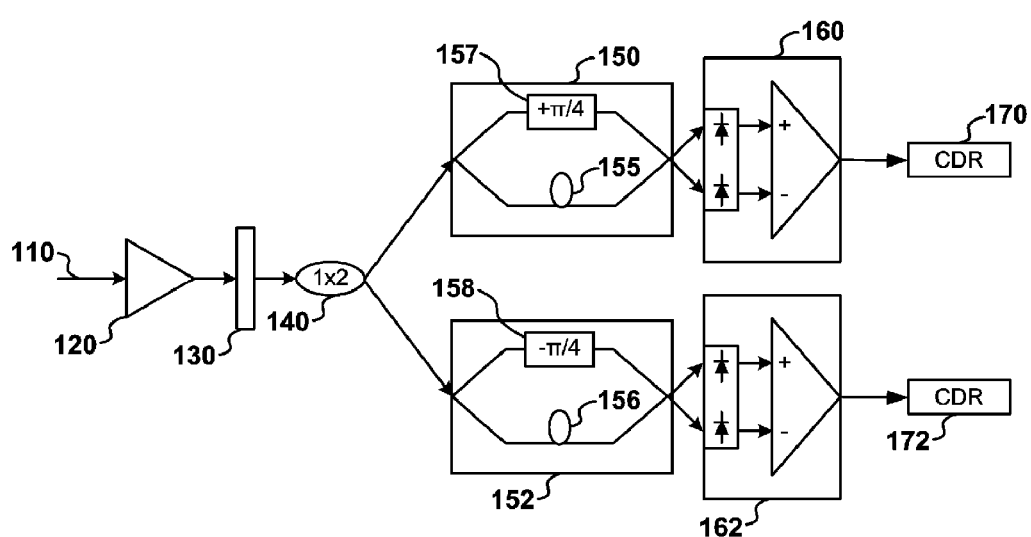
FIG. 1 is a schematic of a generalized, PRIOR ART DQPSK receiver having two optical delay interferometers for demodulation.

With initial reference to FIG. 1, there is shown a generalized, PRIOR ART optical DQPSK demodulator 100. With such a PRIOR ART optical demodulator, an optical DQPSK signal 110 having 2 bit/symbol say, is amplified through the effect of an optical amplifier 120, the output of which is subsequently filtered by an optical filter 130 and then split by 1×2 optical coupler/splitter 140.

Since a DQPSK signal comprises two tributaries, the 1×2 split of the optical coupler 140 is necessary to provide signal(s) to the two optical delay interferometers (ODIs) 150, 152 each including a delay loop 155, 156 and a phase shifter 157, 158, respectively. (Note that the phase shift in this exemplary discussion is shown as $+\pi/4$ and $-\pi/4$). As noted before, these two phase shifts have to be precisely controlled and maintained. More specifically, for 40-Gb/s DQPSK systems, the free spectral range (FSR) of the ODI is approximately 20 GHz. The tolerance to the frequency mismatch resulting from non-perfect phase shifts is less or about ±0.5 GHz. Additionally, the fiber-based or planar-waveguide based ODIs usually exhibit a temperature sensitivity of about 1 GHz/° C., so the temperature of the ODIs has to be controlled and maintained within less or about 0.5° C., which is quite demanding.

Continuing with our discussion of the PRIOR ART apparatus shown in FIG. 1, optical signals output from the ODIs 150, 152 are received by balanced detectors 160,162, the output of which is provided to clock and data recovery circuitry 170, 172. As can be readily appreciated at this point, each of the "branches" of the PRIOR ART demodulator 100 permits the extraction of the two tributaries comprising the DQPSK signal by the clock data recovery circuitry 170, 172, respectively. As also noted before however, the four optical paths starting from the optical coupler 140 and ending at the four balanced detectors situated in the two balanced detectors 160 and 162 have to have essentially the same length. In addition, the electrical path length between the balanced detector 160 and the clock and data recovery circuitry 170 has to be essentially equal to that between the other balanced detector 162 and its respective clock and data recovery circuitry 172. More specifically, for 40-Gb/s DQPSK systems, the bit period is 50 ps. Consequently, the tolerance to delay mismatch resulting from unequal path lengths is only about 10% of the bit period or 5 ps, which translates into only about 1 mm in length in optical fiber!

As noted before and as can be readily appreciated, such a PRIOR ART implementation is quite susceptible to variations in temperature, and any temperature variations that may exist between the two ODIs 150 and 152. As a result, in order to provide such temperature control and stabilization, additional performance monitoring and feedback control components are required which unfortunately, adds to the complexity and cost of such PRIOR ART implementations.

Figure 2:
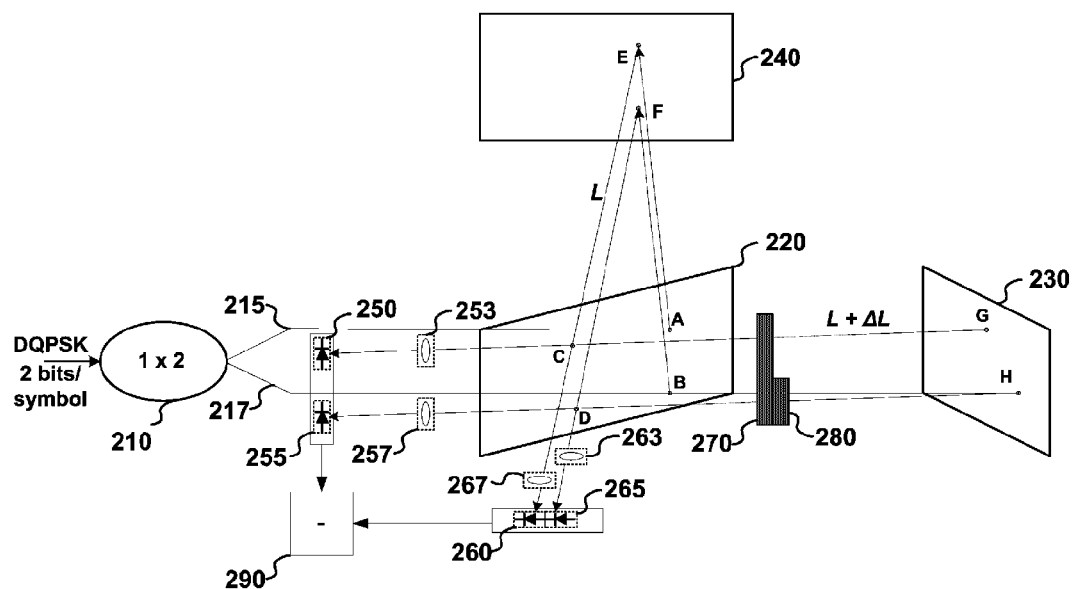
FIG. 2 is a schematic of a DQPSK demodulator according to the present invention.

Turning now to FIG. 2, there is shown a schematic of a DQPSK demodulator 200 constructed according to the inventive teachings of the instant application. As can be readily observed from that FIG. 2, this inventive demodulator 200 uses a single ODI—based on a free-space Michelson interferometer comprising a beam splitter 220 and two reflectors (mirrors) 230 and 240—the reflectors being positioned substantially perpendicular to the plane formed by the signal optical paths. This arrangement results in two distinct optical paths, each having a characteristic path length of L and L+ΔL, respectively. The path length difference ΔL is such that the resulting delay is about a bit period of the signal. For 40-Gb/s DQPSK, ΔL is about 15 mm in free-space. If we use a FSR of 25 GHz so that the ODI can be used for multiple wavelength channels that are on the ITU 50-GHz channel grid, ΔL is about 12 mm in free-space.

The first optical path having a characteristic path length of L includes those paths between optical splitter 220 and reflector 240. The second optical path having a characteristic path length of L+ΔL includes those paths between the optical splitter 220 and reflector 230. In addition, and as shown in this FIG. 2, one of the optical paths (in this example, the second optical path) may include a π/2 phase shifter 280, and/or a thermal/athermal waveplate 270, which may advantageously be coupled or otherwise combined with the phase shifter 280.

A single DQPSK signal having 2 bits/symbol is split into two optical signals (215, 217) through the effect of a 1×2 optical coupler 210 (e.g., a 3 dB coupler). The optical coupler 210 splits the single DQPSK signal light into two separate signals, 215, 217, each exhibiting substantially equal power(s). These two split signals 215, 217 are directed into the interferometer where portions traverse the two optical paths.

More specifically, the split optical signal 215 strikes the beam splitter 220 (Point A) where it is further split. A first portion of that further split signal 215 is directed to reflector 240 (Point E) where it is reflected back to beam splitter 220 (Point C). This path, defined by the round trip between the beam splitter 220 and reflector 240, exhibits a path length of L.

It should be noted that reflectors (mirrors) 240, and 230, preferably have a reflectivity of essentially 100%.

A second portion of that further split signal 215 is directed to another reflector 230 (Point G) from which it is reflected back along an optical path to beam splitter 220 (Point C). This second optical path, defined by the round trip between the beam splitter 220 and reflector 230, exhibits a path length of L+ΔL. Upon striking Point C, the two split signals interfere with each other both constructively- and destructively. Without losing generality, the constructive interference component emits from Point C and is directed to a first detector 250, while the destructive interference component emits from Point C and is directed to a second detector 260. The difference between the signals received by the detectors 250 and 260, which can be obtained through a differential amplifier situated inside a differential amplification unit 290, is then used to recover the first-tributary of the original DQPSK signal.

Similarly, the split optical signal 217 strikes the beam splitter 220 (Point B) where it is further split. A first portion of that further split signal 217 is directed to reflector 240 (Point F) where it is reflected back to beam splitter 220 (Point D). This path exhibits a path length of L.

A second portion of that further split signal 217 is directed to another mirror 230 (Point H) from which it is reflected back along an optical path to beam splitter 220 (Point D). This second optical path exhibits a path length of L+ΔL. Upon striking Point D, the two split signals interfere with each other both constructively and destructively. Without losing generality, the constructive interference component emits from Point D and is directed to a third detector 255, and the destructive interference component emits from Point D and is directed to a fourth detector 265. The difference between the signals received by the detectors 255 and 265, which can be obtained through another differential amplifier inside the differential amplification unit 290, is then used to recover the second-tributary of the original DQPSK signal.

Shown further in that FIG. 2, is a π/2 phase shifter 280 interposed in the optical path traversed by optical signal 217, and having a path length of L+ΔL. This π/2 phase shifter 280 introduces an optical phase delay of π/2 between path A-G-C and path B-H-D. Those skilled in the art will quickly recognize that such a phase shifter may be implemented through the application of a suitable thin-film coating, applied to a suitable transparent substrate 270 or the mirror 230. The phase shifter can also be interposed in the optical path traversed by optical signal 215, and having a path length of L. Note that not shown in FIG. 2 are precise phase controls that ensure that a +π/4 (or −π/4) phase shift between the path A-E-C and A-G-C, and a −π/4 (or +π/4) phase shift between the path B-F-D and B-H-D at the signal center frequency.

From this FIG. 2, it should be readily apparent to those skilled in the art that the inventive DQPSK demodulator allows the beam splitter, reflectors/mirror(s), and an entire optical package so constructed to be shared by two tributaries. In addition, the use of the π/2 phase shifter ensures that the two tributaries are also aligned correctly with respect to each other, essentially independent of changes in laser frequency and ambient temperature. Accordingly, this inventive design permits the construction of a compact, yet highly reliable demodulator.

In those instances where source laser frequency is locked with sufficient precision, this inventive demodulator may be made athermal and passive, thereby permitting the DQPSK tributaries to be received without any monitoring and feedback control. The athermal operation of the ODI can be achieved by fixing the free-space path length using an athermal material, so no temperature stabilization is required.

Alternatively, if an adjustable demodulator is desired—for tracking the laser frequency drift, say—a temperature sensitive waveplate 270 may be interposed along an optical path. Shown in the FIG. 2 is a thermal/athermal waveplate 270, positioned in the optical path taken by optical signal 217, and having a path length of L+ΔL. For design and or construction convenience, the waveplate 270 may be combined with phase shifter 280.

Of further advantage—because the size of beam splitter 220 may be much larger than the beam size of the optical signals 215, 217, the four detectors may be optically coupled directly to the beam splitter 220 with, for example, fiber-coupled lenses 253, 257, 263, 267. The fiber connections can be made having matched length(s) so that not any additional fiber or other coupling mechanism(s) are needed. As a result, demodulators constructed according to the inventive teachings of the present application exhibit low loss and permit a more compact design while, at the same time enhancing the manufacturability and reliability.

Finally with reference to FIG. 2., the detector outputs are appropriately subtracted to obtain the differences between the detected constructive interference signals and the detected destructive interference signals. This is performed by the differential amplification unit 290. The results, after clock and data recovery, recover the two tributaries of the original DQPSK signal.

Figure 3:
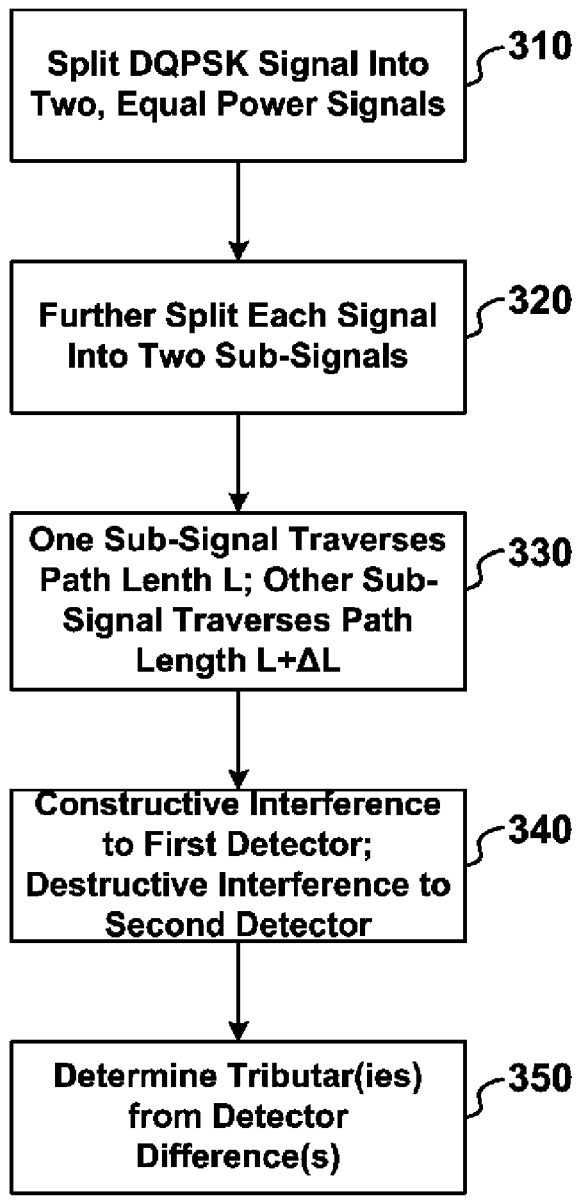
FIG. 3 is a flowchart depicting the inventive method according to the present invention.

Turning now to FIG. 3, there is shown a flowchart which depicts an overview of the inventive method. As indicated by Block 310 of that FIG. 3, a DQPSK signal is split into two signals exhibiting substantially equal power. These two signals are then introduced into a Michelson interferometer where they strike a beam splitter and are further split into two, sub-signals each (Block 320).

The sub-signals that are split from the same equal power signal(s) traverse two different paths within the Michelson interferometer, wherein each of the paths have a different length (Block 330).

The light emission due to the constructive interference of the two sub-signals is directed to a first detector, while the light emission due to the destructive interference of the two sub-signals is sent to a second detector. (Block 340). One tributary of the original DQPSK signal is determined from the difference between these two detected signals (Block 350).

At this point, while we have discussed and described our invention using some specific examples, those skilled in the art will recognize that our teachings are not so limited. Accordingly, our invention should be only limited by the scope of the claims attached hereto.

What is claimed is:

1. A method for demodulating a DQPSK optical signal comprising:
   splitting, the DQPSK signal into two optical signals;
   further splitting, each of the two optical signals into two sub-signals through the effect of a single, free-space beam splitter;
   directing, the two sub-signals split from one of the two optical signals along two, unequal length optical paths, wherein the path length difference between the unequal length optical paths is maintained to be substantially equal to the distance traversed by the optical signal in one bit period;
   shifting the phase of one or more of sub-signals by a predetermined fixed amount prior to interference through the effect of a single phase shifter interposed in at least one of the optical paths;
   generating, constructive and destructive interference signals from the two sub-signals through the effect of the free-space beam splitter;
   detecting, a signal resulting from the constructive interference of the two sub-signals after said sub-signals traverse the unequal length optical paths;
   detecting, a signal resulting from the destructive interference of the two sub-signals after said sub-signals traverse the unequal length optical paths; and
   determining, a tributary of the DQPSK signal from the detected constructive interference signal and the detected destructive interference signal;
   wherein the shifted phase difference between two-sub signals that originate from two different optical signals but share the same path is substantially equal to $\pi/2$.

2. The method of claim 1, wherein said determining step further comprises the steps of:
   determining, through the effect of a differential amplifier, the difference between the detected constructive interference signal and the detected destructive interference signal.

3. The method of claim 1, further comprising the steps of:
   adjusting, a path length through the use of a temperature sensitive waveplate.

4. The method of claim 1 wherein said unequal path lengths are unequal in length by an amount substantially equal to the length traversed by one bit period of the DQPSK signal.

5. An optical demodulator comprising:
   a first optical coupler which splits a DOPSK optical signal into two optical signals;
   an optical beam splitter which simultaneously splits each of the two optical signals into two sub-signals each, and directs the sub-signals into two optical paths;
   a first optical path, said first optical path being defined by an optical path from the optical beam splitter, to a reflector, and back to the optical beam splitter;
   a second optical path, said second optical path being defined by an optical path from the optical beam splitter, to a second reflector, and back to the optical beam splitter, wherein said second optical path is longer than the first optical path, wherein first and second reflectors are positioned at a predetermined distance such that the path length difference between the first and second optical paths is maintained to be substantially equal to the distance traversed by the optical signal in one bit period;
   a single phase shifter, interposed in at least one of the optical paths, to introduce a phase shift between the two optical sub-signals that traverse the same path; and
   wherein the phase of one or more of the sub-signals are shifted by a predetermined fixed amount and the shifted phase difference between two sub-signals that originate from two different optical signals but share the same path is substantially equal to $\pi/2$ and said optical beam splitter combines light from the first optical path and the second optical path to cause constructive and destructive interferences such that a tributary of the optical signal is determined from the difference between a measure of a signal resulting from the constructive interference and a signal resulting from the destructive interference.

6. The optical demodulator of claim 5 wherein said two optical signals that are split from the initial optical signal are substantially equal in optical power.

7. The optical demodulator of claim 6 wherein said initial optical signal is a DQPSK optical signal exhibiting 2 bits/symbol.

8. The optical demodulator of claim 7 wherein said second optical path is longer than the first optical path by an amount substantially equal to the length traversed by one bit period of the DQPSK signal.

9. The optical demodulator of claim 5 wherein each pair of sub-signals that are split from said two optical signals and traverse along the same path are spatially separated.

10. The optical demodulator of claim 5 wherein said phase shifter(s) result in a phase difference of substantially $\pi/2$ between the two optical sub-signals that traverse the same path.

11. The optical demodulator of claim 5 wherein the path difference between the two optical paths includes a free space region.

12. The optical demodulator of claim 5 wherein the path difference of the two optical paths is sufficiently temperature insensitive.

13. The optical demodulator of claim 5 further comprising:
   an optically transparent element, interposed within one of the optical paths, producing a relative phase delay between the two optical paths that is adjustable, wherein the adjustability of the phase delay is produced by a mechanism selected from the group consisting of: thermally adjustable, mechanically adjustable.

14. The optical demodulator of claim 5 further comprising:
   at least two optical detectors, one for detecting the optical signal resulting from the constructive interference and one for detecting the optical signal resulting from the destructive interference.

15. The optical demodulator of claim 5 further comprising:
   a subtractor, for determining the difference between the constructive interference generated signal and the destructive interference generated signal such that a signal tributary of the input optical signal may be determined.

* * * * *